Figure 1:
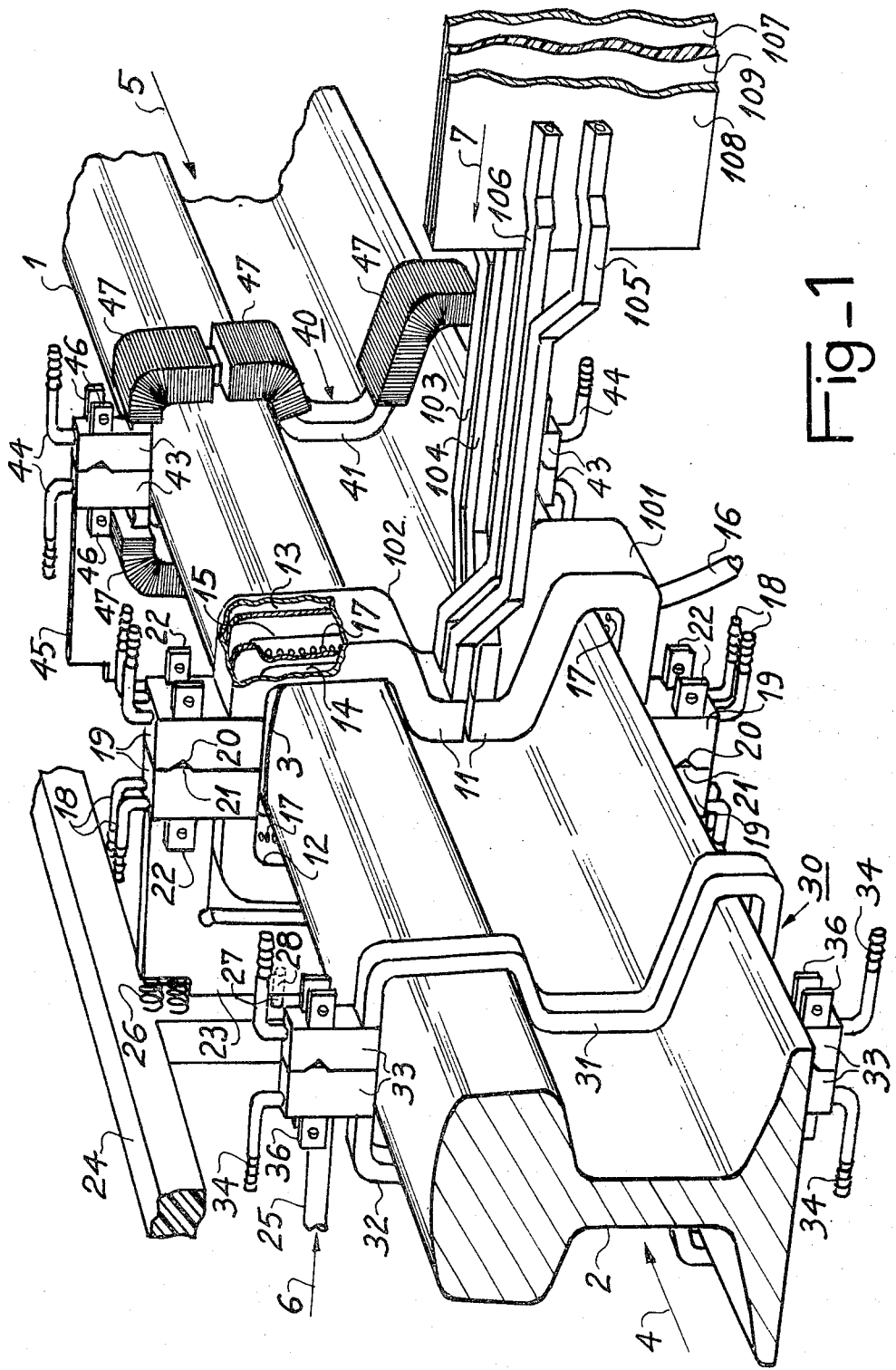

United States Patent [19]

Reboux et al.

[11] 4,300,031
[45] Nov. 10, 1981

[54] METHOD FOR INDUCTION BUTT-WELDING METAL PARTS, IN PARTICULAR PARTS OF IRREGULAR CROSS-SECTION

[75] Inventors: Jean Reboux; Jean-Pierre Lamote, both of Paris, France

[73] Assignee: Tocco-Stel, Paris, France

[21] Appl. No.: 137,185

[22] Filed: Apr. 4, 1980

Related U.S. Application Data

[63] Continuation of Ser. No. 930,844, Aug. 4, 1978, abandoned.

[30] Foreign Application Priority Data

Aug. 5, 1977 [FR] France .............................. 77 24222

[51] Int. Cl.³ .......................... H05B 6/06; H05B 6/44
[52] U.S. Cl. .................................. 219/10.41; 219/9.5; 219/10.75; 219/10.79
[58] Field of Search .................... 219/9.5, 8.5, 10.41, 219/10.43, 10.49 R, 10.53, 10.57, 10.75, 10.77, 10.79, 53, 54, 55, 57; 238/14.05, 14.1–14.9, 14.11–14.15, 151, 164; 228/7

[56] References Cited

U.S. PATENT DOCUMENTS

| | | | |
|---|---|---|---|
| 2,448,690 | 9/1948 | Storm | 219/9.5 X |
| 2,575,604 | 11/1951 | Thompson | 219/10.41 |
| 2,590,546 | 3/1952 | Kincaid et al. | 219/10.41 |
| 2,862,092 | 11/1958 | Cowan | 219/9.5 |
| 3,202,791 | 8/1965 | Gillock et al. | 219/9.5 |
| 3,414,697 | 12/1968 | Rudd | 219/8.5 |
| 3,472,987 | 10/1969 | Viart | 219/10.41 |
| 3,478,156 | 11/1969 | Segsworth | 219/10.75 |
| 3,942,090 | 3/1976 | Matthes et al. | 219/10.77 |

Primary Examiner—Elliot Goldberg
Assistant Examiner—Philip H. Leung
Attorney, Agent, or Firm—Edwin E. Greigg

[57] ABSTRACT

Method of butt-welding metal parts by induction, in particular parts of irregular cross-section such as rails, consisting in pressing the parts against one another with an initial pressure for the entire period of heating, in heating them by induction by means of an inductor which encloses the parts parallel to their contours about the plane of their interface, firstly for a first period at a lower frequency and then, for a second period following the first, at a frequency two to four times higher than the first frequency, and, at the end of the second period, in applying the parts against one another at a forging pressure which is from two to more than six times higher than the initial pressure. The quality of the welded joint is greatly improved and the dimensions of the bulge or upset are limited by restricting the depth of the penetration of the induced current to both sides of the interface by means of two short-circuited turns disposed symmetrically relatively to the inductor to either side thereof.

4 Claims, 2 Drawing Figures

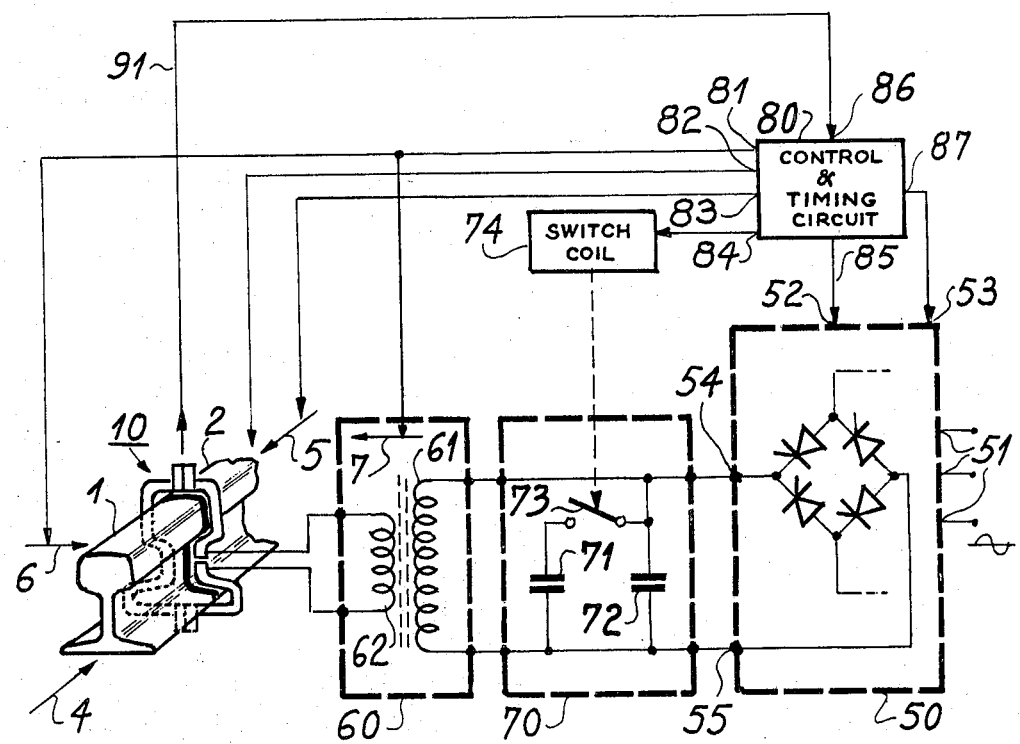
Fig_2

METHOD FOR INDUCTION BUTT-WELDING METAL PARTS, IN PARTICULAR PARTS OF IRREGULAR CROSS-SECTION

This is a continuation of application Ser. No. 930,844, filed Aug. 4, 1978, abandoned.

The present invention relates to a method and apparatus for butt-welding metal parts, in particular steel parts such as rails for example, by induction.

To make butt-joints between metal parts, in particular parts of non-symmetrical cross-section or irregular outline such as rails, the well known process of flash-welding has been generally used, in which the parts to be welded are each connected by their adjacent ends to a source of electrical energy by means of jaws which must establish good contact with the parts.

The process of flash-welding, although generally giving satisfactory results, requires a good deal of care in its application and may have serious disadvantages as regards the quality of the welded joint, such, for example, as the random production of cavities of various sizes at the plane where the weld is located, which considerably reduce its fatigue resistance. In addition, owing to the fact that the jaws have to transmit electrical energy of extremely high intensity to the parts to be welded, they need to be cleaned frequently in order to minimize contact resistance. Another major problem in flash-butt-welding, where the parts are pressed against one another after their opposing faces have been raised to melting point, is the formation of large burrs or irregular bulges which then have to be removed by a burr-removing process using planers or grinders (smoothing or grinding), for example.

To improve the standard of flash welds, it was proposed in French Pat. No. 1,233,273 patented on May 30, 1960, to pre-heat by induction the surfaces which were subsequently to be joined by flash welding, using a mobile inductor which was positioned between the two ends and by moving the inductor so as to cover the entire area of the two ends.

To butt-weld metal parts of substantially symmetrical or regular cross section, such as tubes or cylindrical (round or polygonal) rods, it has also been proposed to employ induction heating using a single inductor which surrounds the parts to be welded on the outside, in the plane where their joining ends are in contact, the ends being pressed against on another when they have reached the forging temperature of the metal (1000° C. to 1300° C. in the case of steel). A process of this kind was described in U.S. Pat. Nos. 3,007,022 patented on Oct. 31, 1961 or 3,031,554 patented on Apr. 24, 1962 to Jackson, or 2,892,914 to Rudd, patented on June 30, 1959, or 2,767,290 to Chapman et al., patented on Oct. 16, 1956.

Another process of this nature was described on pages 637 to 640 of a work by Lozinskij entitled "Industrial Applications of Induction Heating", which was published in 1969 by Pergamon Press, and here it was proposed to use a single-turn inductor fed with a 2,000 Hertz alternating current supplied for example by a motor alternator, and pressures of the order of 250 to 400 kg/cm². This process is difficult to apply to the butt welding of parts of irregular cross-section such as rails where the differences in thickness between the various constituent parts (the head, the web and the flange) make it virtually impossible for them to be heated simultaneously to the forging temperature (equal to or less than 1300° C.) in a relatively brief period (less than 3 minutes), which is necessary to be competitive with flash. Methods for induction butt-welding rails have been proposed in U.S. Pat. Nos. 2,751,479 patented June 19, 1956 and 2,862,092 patented Nov. 25, 1958, to Cowan, respectively teaching the use of an auxiliary member inserted between the end to be joined, which is heated inductively, or of a secondary winding which, when moved to surround the induction coil used for preheating the butting ends, is respectively electrically connected to the parts to be welded to heat them by conduction.

The present applicants have also conducted experiments in butt-welding railway lines using two flat inductors fed with medium frequency currents (1 to 10 kHz), which are arranged facing the surfaces of respective ones of the two ends to be joined and which are provided with magnetic flux concentrators formed by assemblages of U-shaped laminations which straddle the conductors in the parts which face the surfaces concerned (see pages 155 to 160 of the above mentioned work by Lozinskij). A similar arrangement was taught in French Pat. No. 1,447,940 filed Apr. 20, 1964 for pre-heating the facing butt-ends of the metal parts, in view of their pressure welding.

While having advantages from the thermal point of view and while restricting the depth of material which is heated, this process is not industrially viable since it calls for rails weighing some tons to be accurately positioned to within a few tenths of millimeters of the inductors and the lengths of time taken to withdraw the inductors and to bring the rails into position is appreciably longer than with other competitive processes. There is also the problem of a high level of oxidation at the surfaces to be joined while they are being heated, which results in defective welds.

The present invention makes it possible to avoid the disadvantages of the processes mentioned above, by using induction heating to butt-weld metal parts of irregular outline in time intervals comparable with competitive processes (flash-welding, flow) with a considerably higher standard of weld.

According to the invention there is provided a method of butt-welding metal parts, in particular parts of irregular shape, by induction using an inductor divided into two parts (shells) which, when they are brought together, form a single turn which surrounds the two ends to be joined, which latter are pressed against one another with a predetermined initial pressure (5 to 10 tons), the inside face of the turn adjacent the parts following the contours of the parts so that they are situated at a predetermined, substantially constant distance from the outer faces of the parts to be welded, wherein short-circuited turns are arranged at substantially equal distances on either side of the inductor, which turns follow the contours of the two parts closely, in order to restrict the penetration of the magnetic flux, and hence the depth of heating, to the amount necessary and sufficient to obtain a welded joint of good quality. To obtain a more uniform depth of heating, it is possible to space the portions of the short-circuited turns surrounding the more massive sections (the heads) further away from the inductor than those surrounding the less thick sections, by inclining them for example.

The short-circuited turns are also divided into two shells and it is possible to produce them in such a way that they comprise a plurality of sections situated at different distances from the plane defined by the inductor.

To increase their effectiveness, it is also advantageous to provide the short-circuited restrictor turns with conventional flux concentrators for part or all of their length in order to concentrate the current induced in the turns, which are formed by tubular conductors carrying a cooling fluid, at the wall of the turns which adjoins the surface of the parts surrounded by the turns and which is not covered by the assemblages of U-shaped ferromagnetic laminations which straddle the turns and which form the flux concentrators.

The inductor is preferably formed in such a way that an inert gas such as argon can be directed onto the heated area for all or part of the duration of the operation.

In a preferred manner of practising the method according to the invention, the inductor is, after its constituting parts have been brought together, first of all fed for a first period of time of predetermined duration, with a first medium-frequency current of constant intensity having a first, lower frequency (of approximately 1 or 3 kHz), which is intended to heat in particular the massive portions of the parts to be joined, and then for a second period of time also of predetermined duration, with a second medium-frequency current having a second frequency which is two to four times higher than the first one (3 or 9 to 10 kHz), which is intended in particular to bring the thinner portions of the parts and thus the whole of the two ends to be joined to the forging temperature of the metal of which the parts consist. At the end of the second period of time, the pressure with which the two ends are pressed against each other is rapidly increased to a value termed forging pressure (greater than 30 tons).

The butt-welding apparatus which puts into practice the method described above comprises means for pressing the parts against one another, a heating assembly formed by an inductor and two short-circuited turns situated on either side of the inductor, which are divided into two parts and secured to two rams which enable the two parts to be moved towards and away from one another, a movable matching transformer which is secured to one of the parts of the inductor which is fed by the low-impedance secondary winding of the transformer, and whose high-impedance primary winding is connected in parallel with a switchable tuning capacitor bank so as to form a parallel resonant circuit which can be tuned to two resonant frequencies of which the second is of the order of two to four times higher than the first, the parallel resonant circuit being fed by a thyristor (silicon controlled rectifier) inverter having a control circuit which can be switched between the two resonant frequencies of the transformer primary and the capacitor bank. The apparatus also includes a control and timing circuit which successively enables the inverter to be brought into operation at a first frequency corresponding to the first resonant frequency of the tuned circuit, when the inductor has been closed by the rams, the inverter to be stopped after a first period of time and the control frequency and the capacitor bank to be switched in order to tune the oscillating circuit to the second frequency, the inverter to be brought back into operation at the second operating frequency for a second period of time, the inverter to be stopped and, possibly, the heating assembly simultaneously to be withdrawn, and the forging pressure to be applied to the parts to be welded before, at the time of, or after the end of the second period of time.

The invention will be better understood and others of its features and advantages will become apparent from the following description and the accompanying drawings, which are given by way of example, and in which:

FIG. 1 is a partial schematic perspective view of the butt-welding apparatus according to the invention; and FIG. 2 is a highly schematic block circuit diagram of the butt-welding apparatus according to the invention.

In both the figures the same items are referred to by the same reference numerals.

In FIG. 1 is seen a schematic perspective view of part of the induction butt-welding apparatus according to the present invention, which is adapted to weld together under pressure, two adjacent ends of one or two metal parts of various cross-sections, in particular irregular cross-sections, such as steel rails for railways, without the addition of any foreign material and by a method which enables the two ends to be raised to the forging temperature (approximately 1250° C. in the case of steel) by induction using a medium frequency current (1 to 10 kHz), and a rapidly increasing pressure (for forging) then to be exerted on the two ends, one against the other.

In FIG. 1, there is shown at 1 a first rail whose end is to be joined to that of a second rail 2, the outline of the area of contact between them being marked 3. This contact area 3 is brought to the center of an inductor 10 which is divided into two equal parts 11 and 12, which parts are so arranged that, when they are in contact (closed up), the inside face of the inductor 10 is substantially parallel to the cross-sectional outline of parts 1 and 2. The optimum distance between the outside face of parts 1 and 2 and the inside face of the inductor is determined by experiment in such a way as to prevent the bulge, which is formed at the time of forging as a result of the two ends being pressed against one another, from being able to touch the inductor.

Each half 11 and 12 of the inductor 10 is formed by two parallel tubular conductors 13 and 14 which are separated from one another by a central compartment 15 which is situated between the adjoining side-walls of the conductors 13 and 14 and which is closed off by outer and inner metal walls of which the first is closed and carries a pipe end 16 enabling it to be connected to a source of an inert gas (not shown) such as argon under pressure, and of which the second, which is situated adjacent the outer surface of the parts 1, 2 to be joined, is provided with regularly spaced holes 17 to allow the gas to be directed onto the heated ends of the parts. Both of the tubes 13, 14 have at their ends tubular pipe ends 18 which enable them to be connected to a circuit for a cooling fluid such as water.

The ends of the two halves 11, 12 of the inductor 10 have massive contact blocks 19 which in the one case contain notches 20 and in the other case carry V-shaped projections 21, to enable the parts to be accurately located when they are brought together. The pipe ends 18 are welded to the blocks 19, which therefore contain pierced holes forming ducts for the circulating fluid which connect the pipe ends 18 to the tubular conductors 13, 14 to allow the blocks 19 to be cooled, in particular at their contacting surfaces which have to carry currents of high intensity.

The first half 11 of the inductor 10 is in turn divided into two substantially equal parts 101 and 102 along a plane normal to both the plane which divides the conductor 10 into the two halves 11, 12 and the interface 3 of the parts 1, 2 to be welded.

The adjoining ends of the two parts 101 and 102 are arranged at a short distance from one another and are insulated from one another (possibly by a spacer of refractory insulating material which is not shown) and they are intended to connect the inductor 10 to respective terminals of a source supplying medium-frequency electrical energy (not shown in FIG. 1).

The connection between the inductor 10 and its electrical supply source is made by two lengths of tubular conductor 103, 104, 105, 106, for each of the parts 101 and 102, which lengths are also intended to connect the latter to the cooling circuit and are, for this purpose, connected respectively to the rectangular tubes 13 and 14 forming the inductor 10.

The pairs of lengths of conductor 103, 104, 105, 106 are secured electrically and mechanically (by brazing or welding) to respective ones of two conductive plates 107 and 108 which they are also intended to cool. The plates 107 and 108 are connected to respective terminals of the supply source and are separated from one another by a sheet of insulating material 109.

Each of the two halves 11, 12 of the inductor 10 is fixed by attachment lugs 22 to a solid support 23 made of a rigid, refractory insulating material such as a compound of asbestos and silicone-based synthetic resin which is marketed in France under the trade name of "Syndanio".

The supports 23 which carry respective halves of the inductor 10 are carried in turn by rigid frames 24 of a stress-resistant, heat-resistant and heat-insulating material which are arranged on either side of the rails to be welded. These frames 24 also carry other items which need to be moved at the same time as the two halves 11, 12 of the inductor 10, which items will be described below. The two frames 24 are secured to the free ends of the rods 25 of respective ones of two hydraulic or electromagnetic rams (not shown) which move them in opposite directions.

The support 23 which carries the half 12 of the divided inductor 10 (and other items which are described below) is connected to the frame 24 by means of compensating springs 26 and guide rods 27 which fit into holes 28, while the support for the other half 11 is secured to the frame which carries it, thus allowing exact location by means of the notches 20 and projections 21 and a calibrated contact pressure between the two pairs of contact blocks 19.

It should be mentioned here that, because of the fact that the first half 11 of the inductor 10 is secured to the secondary of a transformer (not shown) which feeds it through the rigid lengths of conductor 103 to 106 and the plates 108 and 107, which are attached to the terminals of the secondary, the transformer is secured to the frame which is connected to the ram and which carries this half 11 of the inductor 10, and it is also mounted on rollers running on rails (not shown), which guide its movements parallel to those of the ram.

According to the invention, the induction butt welding apparatus includes, in addition to the inductor 10, two short-circuited turns 30 and 40 which are intended to limit the size of the welding bulge and to restrict the depth of the zone heated by the inductor to the depth required to achieve a proper joint between the two adjacent ends of the parts to be welded.

This effect of restricting the depth of heating can be explained by the fact that the currents induced in the short circuited turns 30, 40, which act as secondary windings for a transformer whose primary winding is formed by the inductor 10, set up magnetic fields which are opposed to that set up by the inductor 10, and thus limit the penetration of the magnetic flux from the inductor 10 to approximately half the distance between the latter and the short-circuited turns 30 and 40.

These two turns 30, 40 for restricting the depth of heating are similarly formed from tubular conductors, preferably of square or rectangular cross-section, which are divided into two parts (halves) 31, 32 and 41, 42 along their transverse central plane (of symmetry) and whose ends similarly carry contact blocks 33 and 43, having projections and notches similar to those of the inductor 10, and pipe ends 34, 44 for the flow of a cooling fluid.

The halves of the short-circuited turns 30, 40 are connected to respective ones of the two rams for shifting the inductor 10, via the frames 24 and insulating refractory supports 45 in the same way as the latter, in such a way as to be moved simultaneously.

The frames 24 carried by the rams may advantageously be so designed as to enable the distances separating the short-circuited turns 30, 40 from the inductor 10 to be adjusted. In a useful embodiment, the thickness of the refractory supports 45 is made less than the distance separating the lugs of each pair of lugs 36, 46 for attaching the half turns 31, 32 and 41, 42, to enable the half-turns to be inclined, when they are fitted, by means of packing pieces or spacers (not shown), so that the portions of the turns surrounding the massive sections having a greater cross-sectional area of the parts (1, 2) are further away from the inductor 10 than those adjoining the thinner sections. The effect of such an arrangement is to render depth of the heated zones from the interface 3 between the two parts 1 and 2, more uniform.

A similar effect can be achieved by making the short-circuited turns 30, 40 of a more complicated shape where the distance from the inductor 10 varies with the thickness of the adjoining section of the part, at the cost of a reduction in the rigidity of the turns which has to be compensated for by the rigidity of the insulating refractory supports.

The distance to the inside faces of the restricting turns 30, 40 from the surfaces of the parts 1, 2 may be less than those of the inductor 10, since there are no bulges formed at the points where they are positioned.

An improvement in the effectiveness of the restricting turns 30, 40 may be achieved by providing them with magnetic flux concentrators in the form of assemblages of U-shaped ferromagnetic laminations 47 which straddle or surround the hollow conductor on three sides, leaving free the wall situated facing the part, in which the flow of the induced current is thus concentrated.

These flux concentrators 47 may be arranged over substantially all or part of the length of the turns. In particular, it is possible to provide the portions of the short circuited turn surrounding the thinner sections selectively with flux concentrators 47 so as to achieve a greater restriction on the depth of heating from the interface 3, at these points in order to compensate for loss of heat by conduction to the thicker (more massive) sections and to achieve a similar result to that achieved by inclining or deforming the turns 30, 40, as mentioned above.

It should be mentioned here, that, for rails of standard dimensions, the optimum mean distance between the short-circuited turns 30, 40 and the inductor 10 is approximately 30 millimeters, that the turns 30, 40 are inclined, deformed or fitted with magnetic laminations symetrically about the inductor 10, and that, in the case of other parts of different shapes, the optimum arrangement is determined by experiment to suit the outline shape, nature, and electrical and thermal properties of the material of which the parts are made.

In FIG. 2 is shown, in the form of a block diagram, an electrical circuit for a butt-welding apparatus according to the invention.

In this circuit, the inductor 10 is connected to the secondary (low-impedance) winding 62 of an impedance matching transformer 60 whose primary (high-impedance) winding 61 is connected to a alternating-current generator which, in the present case, is preferably formed by an inverter 50 which allows the three-phase mains voltage (50 to 60 Hz) applied to its inputs 51 to be converted, after rectification and filtering, into a single-phase alternating voltage of medium frequency (1 to 10 kHz), by means of a known static converter employing thyristors (silicon controlled rectifiers) which may be connected in a bridge, for example. The principal advantage of the inverter 50 is that it allows the frequency of the alternating current supplied from its outputs 54 and 55 to be changed easily, this simply calling for a simultaneous change firstly in the resonant frequency of the load connected to its output diagonal, which is formed in the present case by the primary winding 61 of the transformer 60 and a bank of capacitors 70 connected in parallel, and secondly in its control frequency, that is to say the frequency at which the gates of the two pairs of thyristors are triggered alternately by recurrent pulses supplied by a known circuit for controlling the inverter 50, which inverter control circuit is part of the inverter 50. This inverter 50 may be of the parallel resonant or series-parallel resonant load-type (see U.S. Pat. No. 3,466,528 to Adams, issued Sept. 9, 1969, for example), may be controlled by means of pulses furnished by zero-crossing detectors which detect the negative-going zero-crossings of the current flowing through one pair of thyristors for providing delayed triggering pulses to the other pair thereof, thus the changing of the resonant frequency of the load by switching its tuning capacitance to another value implicitly changes the repetition frequency of the thyristor trigger pulses (see, for example, U.S. Pat. No. 3,448,367 to Corey issued June 3, 1969). This change-over of the inverter operating frequency and the time-sequential switching on and off of the inverter 50 and of other operating elements (conveyors, rams, contact makers and breakers) of the butt-welding apparatus is controlled by a control and timing circuit 80 including a plurality of adjustable timers determining the respective durations of the successive heating periods and a plurality of mechanically and/or electromagnetically controlled switches (contact makers and breakers) which check and/or control the overall operation of the butt-welding apparatus as a whole and which may be arranged in a manner easily accessible to the skilled in the electrical art, if the different functions and their time sequence and duration are defined as will be explained hereinafter. This circuit 80 is relatively simple and is not an object of the present invention in itself, therefore it will be only briefly described hereinbelow.

This control and timing circuit 80 is wholly defined by the sequence of operations the butt-welding apparatus has to perform and uses only known elements in a known way. It controls the mechanism for conveying the parts (rails 1 and 2) to be welded end to end to position them with their interface situated substantially aligned with the central elevational cross-sectional plane of the inductor 10, by applying power to electric motors driving the conveying mechanism and cutting this power off when a mechanically actuated switch is closed which indicates their correct position. This switch also authorizes the respective clamping devices to be put on the rails 1, 2, which in turn allows, by means of two other, similar switches the actuation of the pressure exerting means for setting up the initial pressure whose predetermined value is considerably less than the forging pressure applied at the end of the welding process, by means of a set two rams (not shown) represented by arrows 4 and 5. At the same time or slightly thereafter (eventually initiated by a further switch), the closing of the two half-shells 11, 12 forming the inductor 10 as well as that of the short-circuited turns 30 and 40 is carried out by bringing the frames 24 towards one another by actuating another set of rams (not shown) indicated by further arrows 6 and 7. The closing of the inductor 10 (and of turns 30, 40) is indicated by the closing of a still further switch which causes the transmission of a signal by a conductor 91 to an input 86 of the control and timing circuit 80, which authorizes the starting of the operation of the first timer (not shown) for controlling the operation of the inverter 50 at its first, lower frequency for the duration of the first period of time T1. This first, lower frequency F1 is determined by the resonant frequency of the circuit composed of the primary winding 61 of the transformer 60 and of the two sets of capacitors 71 and 72 of the capacitor bank 70 which are connected in parallel by means of switch 73 in its closed position. This switch 73 is controlled by a coil 74 which is fed by the output 84 of circuit 80 which has another output 87 for indicating to a frequency control input 53 of the internal control circuit of the inverter 50, the state of the capacitor bank 70, i.e. the position of switch 73. This inverter control circuit for applying triggering pulses to the thyristor gates is of a known type, and the signal at input 53 may be used, in a known way, to change the repetition frequency of these pulses in accordance with the resonant frequency of the load circuit (61, 70) of the inverter 50 if it is not controlled by the resonant load. The first timer, which is of a known type (such as timers currently used in household appliances or electrical resistance or induction furnaces, as described in U.S. Pat. No. 3,548,126 to Bassett granted Dec. 15, 1970, for example) may include a synchronous motor which is started by the application of a.c. power and which drives a plurality of cams acting on levers which actuate switches. After starting, the first timer controls the application either of a.c. power to the rectifier (not shown) supplying the inverter 50, or of the d.c. power from this rectifier, or of a.c. or d.c. power to the inverter control circuit, for example, to bring the inverter 50 into operation for a first time at the first, lower frequency F1, and the cutting off of this power after a first period of time T1 for stopping the inverter 50. The duration of this first time period T1 is predetermined and may be adjusted (by the shape of the cam or the motor speed, for example) as a function of the size of the more massive (bearing head) portions of the parts 1, 2.

When the inverter 50 has been switched off, another switch acts on coil 74 to open the switch 73 so that the second set of capacitors 71 is disconnected, whereby the resonant load (61, 70) is tuned to its second resonant frequency (F2) which is two to four times higher than the first one (F1), its choice depending on the thickness of the thinner portions (web and flanges) of the parts 1, 2. The opening of switch 73 may be indicated by another switch ganged to it and controlled by coil 74 or by the power applied to the coil 74, for starting a second timer (not shown) which again controls the operation of the inverter 50 through output 85 of circuit 80, similarly to the above-described manner, while the output 87 indicates the second resonant frequency of the load and eventually makes the inverter 50 operate at its second frequency F2 for a second time period T2 sufficient to bring the whole of the two ends to the forging temperature. At the end of this second time period T2, the inverter 50 is stopped again and other cams of the second timer actuate other switches respectively controlling the application of a forging pressure, four to eight times higher than the initial pressure, by the rams 4, 5, the opening of the divided inductor 10 and turns 30, 40. Thereafter, the welded joint is transferred to a de-bulging station where the upset (bulge) is removed.

Such switches (contactors) and different timing and sequence controls as applied to resistance or induction welding are well known in the art and disclosed, for example, in the "Welding Handbook" published by the American Welding Society, third edition of 1950, pages 336 to 334 and 467 to 468.

The way in which the welding installation as a whole operates, which characterizes the method of butt-welding according to the invention, is as follows:

When a transporting (or conveying) arrangement (not shown) has brought the two parts 1, 2 into the field of the inductor 10 with their two adjoining ends face to face, the parts are clamped to respective rams (not shown) which apply to them, in response to a signal supplied by output 83 of circuit 80, an initial pressure (of approximately 5 to 10 tons for standard rails) which presses the adjoining faces against one another, which enables oxidation of these faces, during the heating, to be considerably reduced.

After the parts 1 and 2 have been brought into position with their interface 3 situated substantially at the centre of the inductor 10, the two halves 11, 12 of the inductor are moved towards one another, as also are the halves of the short-circuit turns 30 and 40, by means of another set of two rams, (not shown) in the directions of arrows 6 and 7, these rams being controlled by a signal supplied by output 81 of circuit 80.

When a position detecting switch (not shown) applies, via conductor 91, a signal indicating that inductor 10 has been closed to the input 86 of circuit 80 to authorize the inverter 50 to come into operation, output 84 of circuit 80 activates the coil 74 of a contactor 73 to place capacitors 71 and 72 in parallel, and the first timing device (timer), which is brought into action at this moment, operates the control circuit of the inverter 50, via the output 85 connected to input 52, so that it supplies pulses to the gates of the thyristors at a repetition frequency corresponding to the lower resonant frequency F1 of the parallel resonant circuit 61, 70 connected to the output terminals 54, 55 of the inverter, this frequency being set in the neighbourhood of 1 to 3 kHz depending upon the dimensions of the massive sections of the parts (for rails F1=3 kHz proves advantageous).

After a first period of time t1, which varies as a function of the power supplied by the inverter, the dimensions of the parts and the materials of which they consist, and which is approximately two minutes at full power (approximately 150 kilowatts) for standard rails, the first timing device (or timer) in circuit 80 causes the inverter 50 to stop, via output 85, and, via output 84 causes contactor 73 to change over to disconnect capacitor 71, in order to obtain a second resonant frequency F2 for the oscillating circuit 61, 71 which is two to four times higher than the first one F1 (for standard rails F2=9 to 10 kHz is particularly useful).

When the capacitance of circuit 70 has been altered, circuit 80 brings into operation its second timing device (or timer) which, via output 87, applies a signal to the control input 53 to change over the repetition frequency of the control circuit of the inverter 50 so that it corresponds to the second resonant frequency F2 (which is set at 9 to 10 kHz for standard rails) and to allow the inverter 50 to be brought into operation again for the duration of a second period of time t2 (approximately 20 seconds), which is sufficient to raise the whole of both the ends to be joined to the forging temperature (1250° to 1300° C. for rail steel).

At the end of this second period of time t2, the second timing device (timer) in circuit 80, via output 87 and input 53 for example, causes the inverter 50 to stop, and this is followed by the two halves of the inductor 10 being moved apart by means of the rams 6, 7 which are controlled from output 81 of the control and timing circuit 80.

In a first modification of the method according to the invention, the forging pressure, whose value is three to six times higher than the initial pressure (of the order of 30 tons or more for standard rails) is applied only at the moment when the inverter 50 stops, in response to a signal from output 82 which acts on rams 4 and 5 and which is generated by the stopping of the second timer, thus enabling provision to be made for smaller clearance and closer coupling between the inductor and the surface of the rail given that the opening of the inductor and the forging of the rail which produces the bulge, begin simultaneously.

In a second modification of this method, the forging pressure is applied a few seconds (5 to 10 for example) before the inverter 50, which is operating at its higher frequency F2, stops, and thus before the two halves of the inductor 10 move apart. In this case the signal supplied by output 82 to the forging rams 4 and 5 comes from a third timing device in circuit 80, for example, which is started at the same time as the second timer.

When the forging has been completed and the halves of the inductor 10 have been moved apart from one another, the conventional transporter arrangement is brought into operation again to remove the rail and to move it to a grinding station for it to be deburred (rendered smooth by removing the bulge) and to bring two other parts to be welded into position.

It should be mentioned here that the forging operation, whose duration is generally less than ten seconds, may be performed by a gradual increase in pressure from its initial value (5 to 10 tons) to its maximum value (approximately 30 tons), using a set of valves which are operated in succession in such a way as to observe an optimum pattern of increase, which is arrived at by experiment.

The total duration of the cycle of operations described above is approximately two to three minutes, which shows that butt-welding by induction (and forging) is competitive with other known methods such as flash-welding or aluminothermy-melting and flow either with or without pressure.

The welding apparatus according to the invention may be made more economical by using a single forging ram 4 or 5 which acts on one of the parts 1 or 2, the other part being secured to a fixed bed by means of clamping jaws for example. In this case, and if use is made of the second modification of the method where heating goes on while the forging pressure is being applied, the assembly comprising the inductor, the short-circuited turns, the support frames, the transformer (60) which supplies the inductor, and the rams which bring about their movements in a direction perpendicular to the forging pressure, must be mounted on a carriage which is movable in this direction and which is secured to the part moved by the forging ram, so that the inductor will remain stationary in relation to the interface between the two ends to be welded.

As stated above, the depth of the zone heated by induction is determined by the distance between the inductor and the short-circuited turns arranged on either side of the latter. Thus, since this distance also determines the thickness of the bulge, the value selected for it will represent a compromise between the strength of the welded joint and the thickness of the bulge, which also needs to be as small as possible.

What is claimed is:

1. A method for induction butt-welding of elongated metal parts of irregular cross-section having respective longitudinal axes and flat abutting ends normal to said axes, employing a single-turn inductor enclosing the adjoining butt ends and having an inner face substantially parallel to the cross-sectional contour of the parts, when its movable two halves from which it is made up, are brought into contact together prior to applying thereto an alternating current from a low-impedance secondary winding of an impedance matching transformer whose high-impedance primary forms, together with a switchable bank of capacitors connected in parallel thereto, a parallel resonant tank circuit connected to the output terminals of an inverter capable of operating at at least two different frequencies for supplying thereto an alternating current of a frequency to which the loaded tank circuit is tuned, prior to closing the inductor and to its subsequent feeding by the starting of the inverter, the registering abutting ends of the parts being pressed one against the other with a predetermined initial pressure, and substantially at the end of the heating by the current supplied to the inductor they are being pressed together by a predetermined forging pressure which is from three to more than six times higher than said initial one, the following combination of steps:

(a) closing by bringing together into contact of two short-circuited turns respectively similarly made up from two halves as said inductor, simultaneously with the closing thereof, said short-circuited turns similarly having inner faces respectively surrounding said two parts substantially in parallel to their cross-sectional contours and which are disposed at predetermined distances to either side and respectively symmetrically relatively to said inductor whose cross-sectional plane is substantially aligned with the interface of the abutting ends and maintaining their closure while the inductor is being fed, whereby to restrict the depth of the inductively heated zones to either side of said interface and limit the dimensions of the projecting bulges due to the upset caused by the forging pressure; and (b) thereafter switching the bank of capacitors so that it presents its first, higher capacitance which determines the first, lower resonant frequency of the tank circuit, and subsequently operating the inverter at a frequency corresponding to said first one for a first predetermined time interval, the switching over of the capacitor bank so that it presents its second, lower capacitance which determines the second resonant frequency of the tank circuit which is two to four times higher than the first and subsequently operating the inverter at a frequency corresponding to the second one during a second predetermined time interval, whereby to obtain a more uniform cross-sectional heat distribution, whereby the combination of said steps allows to reduce loss of heat energy by concentrating it to the useful zones of the abutting end and shortens the overall heating time.

2. A combination of method steps as claimed in claim 1, wherein said short-circuited turns are so arranged that the distance between the abutting end interface and their portions increase with the cross-sectional area of the adjacent portions of the parts which they surround.

3. A combination of method steps as claimed in claim 1, wherein the short-circuited turns are so arranged that the coupling of their portions to the adjacent part portions decreases with the cross-sectional areas thereof.

4. A combination of method steps as claimed in claim 1, wherein an increase in the coupling of the short-circuited turn portions adjacent the thinner part portions is obtained by means of ferro-magnetic U-shaped laminations straddling them.

* * * * *